(12) United States Patent
Benner, Jr. et al.

(10) Patent No.: US 7,092,135 B2
(45) Date of Patent: Aug. 15, 2006

(54) MOVING MIRROR OPTICAL SCANNER AND ASSOCIATED METHODS

(76) Inventors: William Benner, Jr., 3214 Regal Crest Dr., Longwood, FL (US) 32779; Aron Bacs, Jr., 14251 Islamorada Dr., Orlando, FL (US) 32837

( * ) Notice: Subject to any disclaimer, the term of this patent is extended or adjusted under 35 U.S.C. 154(b) by 0 days.

(21) Appl. No.: 10/937,066

(22) Filed: Sep. 9, 2004

(65) Prior Publication Data
US 2005/0128545 A1    Jun. 16, 2005

Related U.S. Application Data

(60) Provisional application No. 60/501,254, filed on Sep. 9, 2003.

(51) Int. Cl.
*G02B 26/08*    (2006.01)
(52) U.S. Cl. ...................... 359/196; 359/212
(58) Field of Classification Search ........ 359/196–199, 359/212–214
See application file for complete search history.

(56) References Cited

U.S. PATENT DOCUMENTS 4,123,146 A * 10/1978 Dragt ........................ 359/225
6,108,118 A *  8/2000 Minamoto ................. 359/196

* cited by examiner

*Primary Examiner*—Euncha P. Cherry
(74) *Attorney, Agent, or Firm*—Allen, Dyer, Doppelt, Milbrath & Gilchrist, P.A.

(57) ABSTRACT

An apparatus and method for an optical scanner comprises a mirror, a coil, a magnetic circuit, and a support connected to the mirror. The mirror has a reflective surface and a periphery. A coil of electrically conductive material consists of a plurality of windings around the periphery of the mirror. The magnetic circuit comprises a magnet having opposite poles generating a magnetic flux therebetween. A support is connected to the mirror, the support rotatably supporting the mirror in the magnetic flux with the magnetic flux intersecting the coil.

41 Claims, 7 Drawing Sheets

MOVING MIRROR OPTICAL SCANNER AND ASSOCIATED METHODS

RELATED APPLICATION

This application claims priority from co-pending provisional application Ser. No. 60/501,254, which was filed on Sep. 9, 2003, and which is incorporated herein by reference in its entirety.

FIELD OF THE INVENTION

The present invention relates to the field of optical scanners and, more particularly, to an optical scanner having a mirror which generates its own motion by including a coil positioned in the magnetic flux generated by a magnet.

BACKGROUND OF THE INVENTION

Ever since the field of galvanometer-based optical scanning became established approximately 30 years ago, this type of scanning has been accomplished in substantially the same way. A mirror is attached to the shaft of a limited rotation motor, often referred to in the art as a galvanometer or "galvo." As the shaft of the motor rotates, this in turn rotates the mirror. A light beam is reflected off the mirror and, as the mirror is rotated by the motor, the light beam is scanned. Often, two motors and two mirrors are used, and are arranged in such a way as to accomplish X-Y scanning. This is very well known in the art and can be found in numerous patents including Tanaka et al. U.S. Pat. No. 5,130,838 and Montagu U.S. Pat. No. 5,084,904.

The first limited rotation motors (galvanometers) to garner widespread use in optical scanning were made by General Scanning (Brosens U.S. Pat. No. 4,135,119) and MFE Corporation (Burke, Jr. U.S. Pat. No. Re. 31,062). These were of the "moving iron" variety—named after the fact that the rotor is made from a solid or laminated piece of iron. Moving iron galvanometer scanners provided very respectable performance and were in use for approximately 20 years, before being replaced by more modern scanner types. Disadvantages of moving iron scanners are their limited torque to inertia ratio, and relatively high electrical inductance, caused by the fact that the coil is completely surrounded by an iron magnetic circuit.

From approximately 1986 onward, the company Cambridge Technology, of Cambridge, Mass., has manufactured moving coil galvanometer scanners—named after the fact that the rotor is a moving coil of wire rather than iron. Moving coil galvanometer scanners have a number of advantages. One of the advantages is that they have a very low electrical inductance, often being an order of magnitude lower than moving iron counterparts. Another advantage is that the torque-to-inertia ratio is far greater than their moving iron counterparts. However, there are a few disadvantages to moving coil scanners that have prevented their widespread use. One disadvantage is that current flowing through the coil to create the scanning motion causes the coil to get hot, yet there is no effective way to quickly dissipate the heat that is generated because the coil is essentially floating in mid air. Because of this problem, moving coil scanners cannot be used for applications that require a high duty cycle (i.e. constant, high frequency scanning). Another disadvantage is that the long, unsupported spans of coil wires lead to multiple low-frequency torsional resonances, which are highly undesirable.

From approximately 1992 to the present, several companies have manufactured moving magnet galvanometer scanners—named after the fact that the rotor consists almost entirely of a magnet. Examples of moving magnet galvanometer scanners are described in various patents by Montague, including U.S. Pat. No. 5,424,632 and U.S. Pat. No. 5,936,324. Moving magnet scanners have some of the benefits of moving coil scanners, such as relatively low inductance and relatively high torque to inertia ratio. In addition, since the coil is mounted directly to the scanner's back iron, heat dissipation is more efficient than in moving coil scanners. However, there is still room for improvement in optical scanning, particularly in the realm of eliminating torsional resonances that exist largely because of the fact that a relatively long rotor is driving one end of a relatively wide mirror, often times through a shaft whose diameter is relatively small.

As the field of optical scanning has continued to develop, incremental improvements have been made to overcome barriers to higher performance and faster scanning speeds. For example, when moving iron scanners were being used, the barrier to higher performance was the limited torque to inertia ratio and the relatively high inductance. The development of moving coil and moving magnet scanners has overcome those two problems but, currently, torsional resonances present the most difficult barrier to achieving higher accuracy and faster scanning speeds.

Since the current state of the art continues to rely on the "mirror on the end of a motor shaft" construction, there is a "wind up" effect that occurs due to the torsional spring characteristic of long scanner rotors coupled with the mass and inertia of the mirror. Other torsional resonances also occur due to the shape of the mirror and the manner in which the mirror is attached to the shaft. In all cases, these torsional resonances exist because the mirror is being driven from only one end, and because of the torsional springiness of the mirror and motor components.

In response to these problems, various techniques have been employed in an attempt to decrease the frequency of these torsional resonances, or to otherwise manage them, including novel rotor designs described by Montagu in U.S. Pat. No. 5,424,632 and by Brown et al. in U.S. Pat. No. 6,433,449, and also by shaping the mirror and the mirror mount as described by Stukalin et al. in U.S. Pat. No. 6,243,188. Nevertheless, despite these improvements, torsional resonances remain a significant problem.

Torsional resonances continue to be a problem since, most often, galvanometer scanners are used in combination with closed loop servo drivers. These servo drivers are disturbed by the presence of resonances, and if the servo gain is set sufficiently high to achieve fast scanning, uncontrolled oscillation is likely to occur. As a result, servo gain must be kept relatively low and the closed-loop, small-signal bandwidth (i.e. the speed of the scanning) can only be made a fraction of the lowest torsional resonant frequency. For example, many moving magnet scanning systems have torsional resonance frequencies around 8 kHz to 10 kHz, yet in order to maintain good quality scanning, the servo gain and thus closed-loop small-signal bandwidth cannot be made greater than approximately 2.5 kHz.

Yet another disadvantage to the "mirror on the end of a motor" construction is that a substantial amount of the torque generated by the scanner, is actually expended in moving the scanner's rotor itself. Since the rotor ideally has the same inertia as the mirror, this means that effectively half the torque is wasted moving the rotor. This disadvantage is often overlooked as unavoidable, something that "comes with the territory" of placing a mirror on the end of a motor.

A careful review of performance characteristics of the three types of optical scanners mentioned above shows that the torque to inertia ratio is actually highest for moving coil scanners. Likewise, electrical inductance is lowest for moving coil scanners. These are two highly desirable characteristics. However, as noted above the two main drawbacks with moving coil scanners has been inability to effectively dissipate heat generated in the coil during scanning, and multiple low frequency resonances of the scanner caused by the long spars of the coil wires.

SUMMARY OF THE INVENTION

With the foregoing in mind, the present invention advantageously provides an optical scanner. In a preferred embodiment of the invention, the present optical scanner comprises a reflective body having a generally planar reflective surface. A coil of electrically conductive material includes a plurality of windings around a periphery of the reflective body and is connectable to a power source. A magnetic circuit has at least one magnet and preferably also has a pair of magnetically permeable pole pieces, each pole piece of the pair abutting a pole of the at least one magnet, the pair being spaced apart generally opposite each other so as to generate a magnetic flux therebetween. One or more supports are positioned to rotatably support the reflective body relative to the pair of pole pieces and having the magnetic flux intersecting the coil.

BRIEF DESCRIPTION OF THE DRAWINGS

Some of the features, advantages, and benefits of the present invention having been stated, others will become apparent as the description proceeds when taken in conjunction with the accompanying drawings, presented solely for exemplary purposes and not with intent to limit the invention thereto, and in which.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

As shown in FIGS. 3–6, the invention solves a number of longstanding problems of optical scanners by combining the torque generating component directly with the mirror 3. In this invention, a coil 10 is positioned on mirror 3, and a magnetic circuit 12 is employed such that magnetic flux 11 flows approximately perpendicularly in relation to the direction of alternating current flowing through coil 10.

Figure 4:
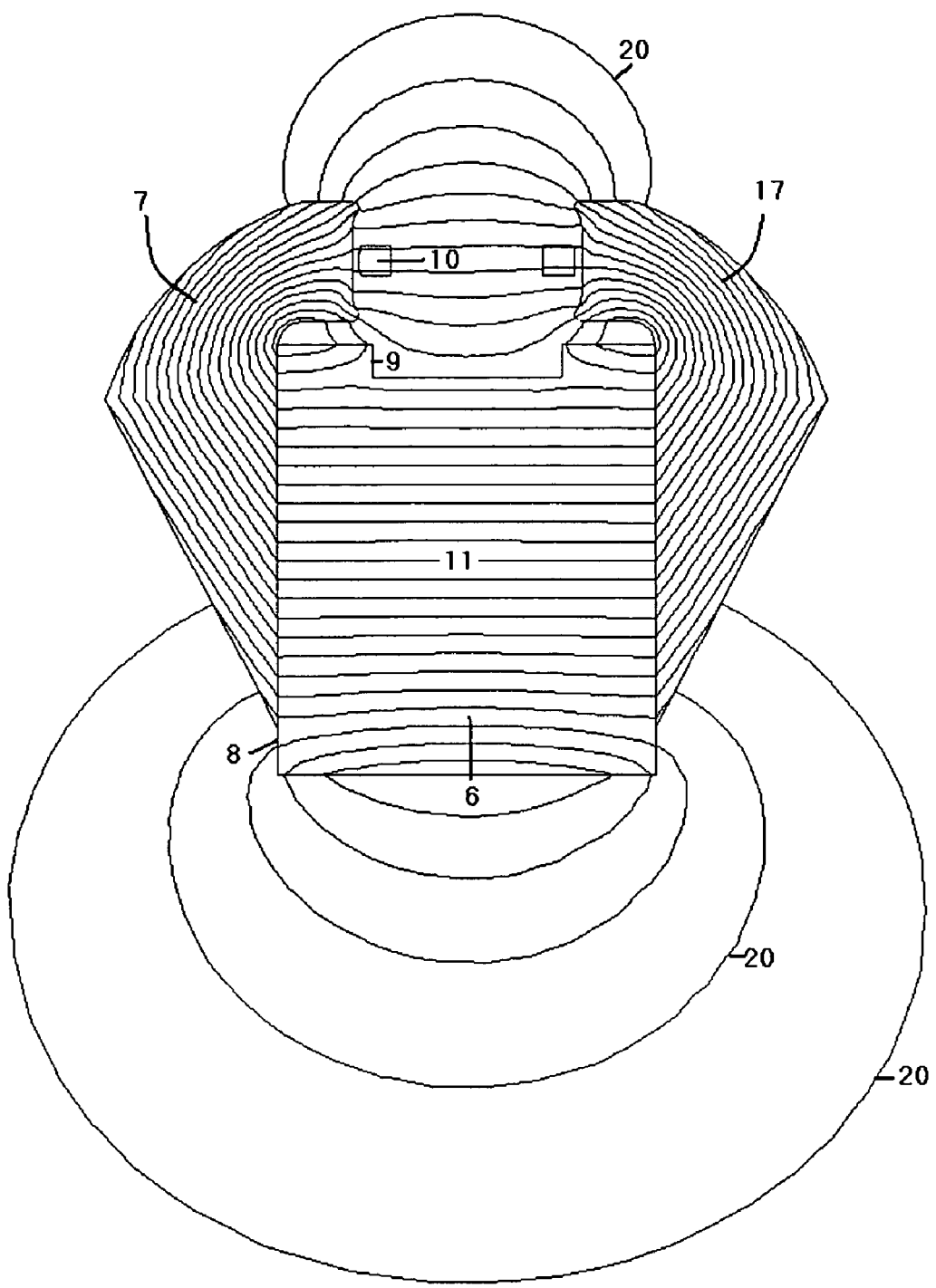
FIG. 4 depicts a simulation of magnetic flux 11 paths in the magnetic circuit 12 employed in the invention of FIG. 3.
Figure 5:
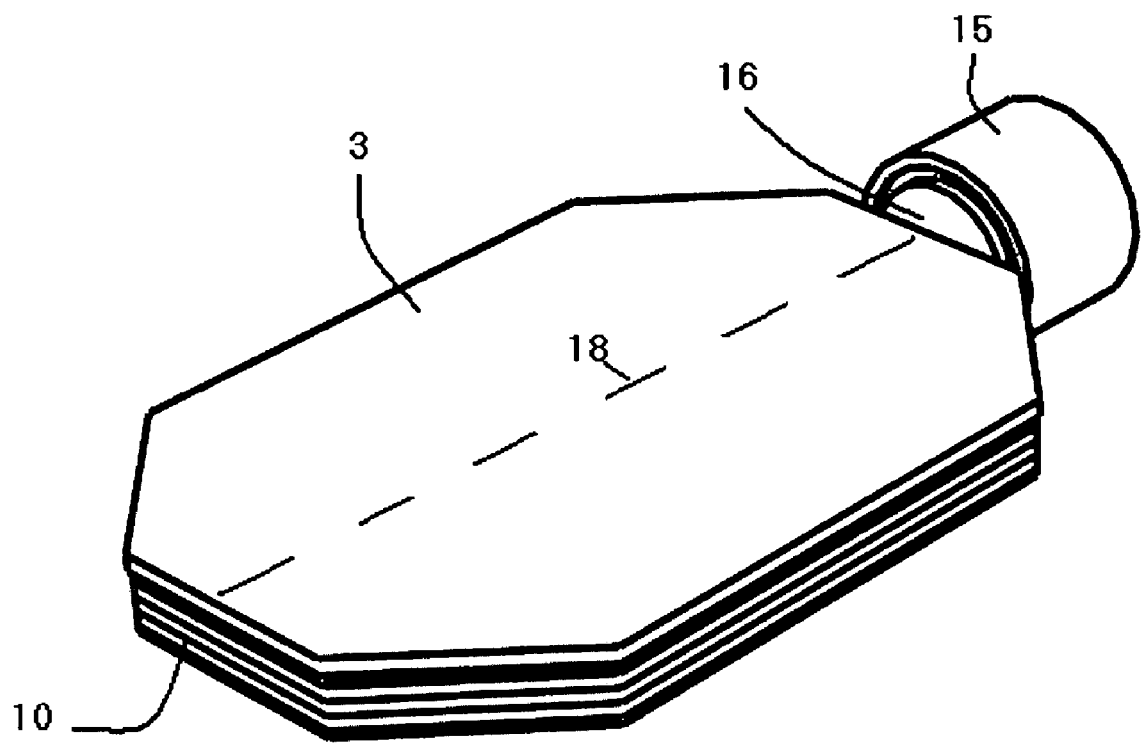
FIG. 5 shows the mirror and coil arrangement of a preferred embodiment of the invention, wherein the coil is wound around a periphery of the mirror.
Figure 6:
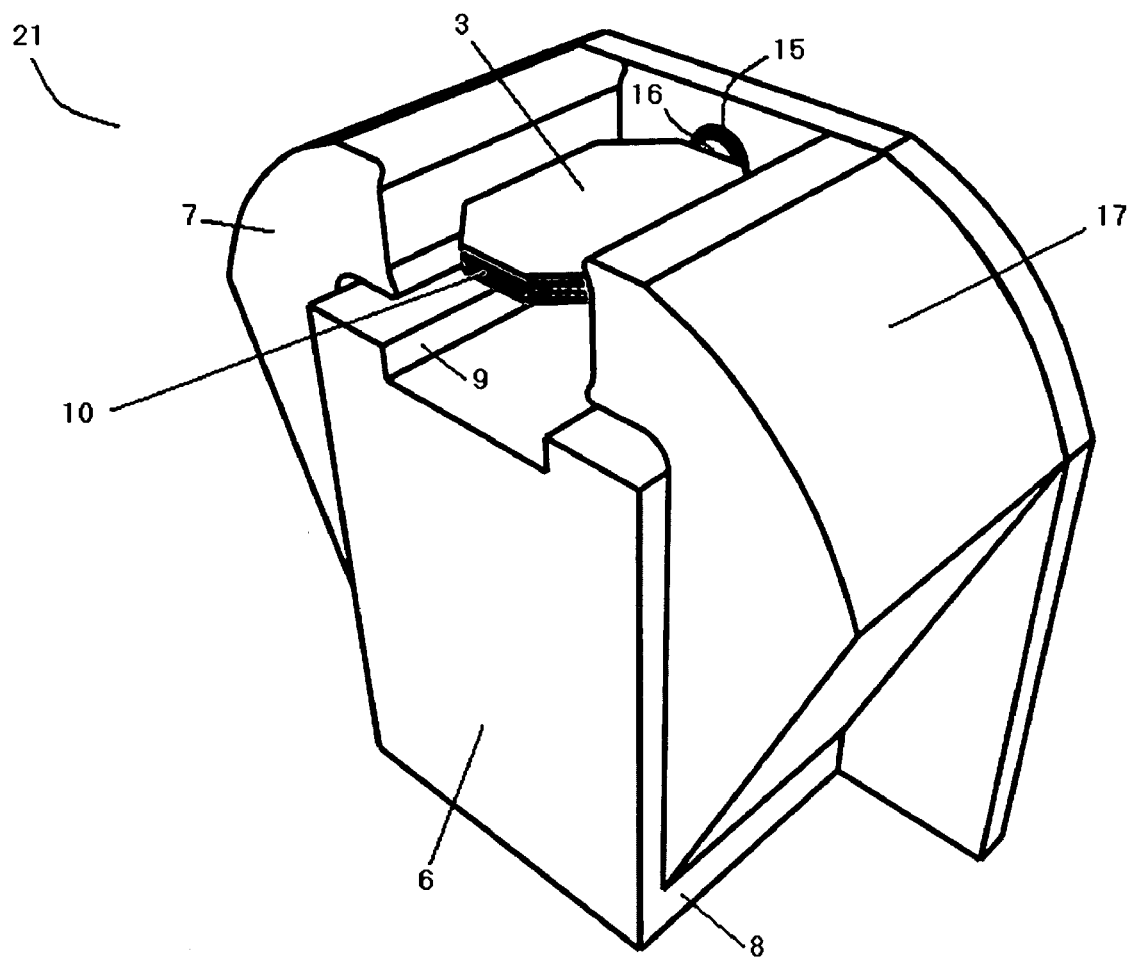
FIG. 6 shows a preferred embodiment of the invention.

The force generated by coil 10, best seen in FIGS. 5–6, is described by the Lorentz force principle, which states that a current carrying conductor will experience a force in a direction perpendicular to the direction of magnetic flux. The force is proportional to flux density, current through the coil 10, number of turns in the coil 10, and length of the coil 10 experiencing the flux. Since this force is present on both sides of the mirror 3, and since the mirror 3 is rotatably supported, preferably along a centralized axis, the force is converted to torque that rotates the mirror 3. In this case, the torque can be fully described by the following formula:

$$\text{Torque}=2BLIN$$

where B is flux density, L is the length of coil 10 that is experiencing flux, I is current in each turn of the coil 10, and N is the number of turns in coil 10. The number 2 appears in front of the equation because since coil 10 is wrapped around the mirror 3, both sides of the mirror 3 are experiencing flux 11. FIG. 4 illustrates the magnetic flux and its relation with coil 10.

Since mirror 3 is driven directly in this fashion, all of the applied energy contributes to moving the mirror and no energy is wasted moving rotor assembly 13 of a motor. Because coil 10 is not completely surrounded on all sides by the magnetic circuit 12, the electrical inductance is very low. Moreover, coil 10 is preferably attached along an outer periphery, or edges, of mirror 3, so that there are no long, unsupported coil spans to resonate. The result is a scanner 21 that provides the benefits of a moving coil scanner, such as high torque to inertia ratio and low inductance, but that does not experience the problems of a moving coil scanner such as poor heat dissipation capacity and multiple low frequency resonances.

A great advantage of this invention is that the mirror 3 is not being twisted from only one end by a shaft 2, as it is with galvanometer-based optical scanning approaches. Instead, the force is applied all along the reflective body, that is, the length of the mirror 3, and this force is substantially the same along the entire length. As a result, all parts of mirror 3 experience equal force and torque so that the entire mirror 3 will rotate as a unit. Accordingly, torsional resonances are substantially eliminated in this invention. Yet another advantage of the present invention resides in the compactness of the present optical scanner. This is due to the fact that the mirror 3 itself is rotating. Thus, there is no long motor 1 attached at one end of the mirror 3 to drive the mirror 3.

In this invention, mirror 3 may be made from any glass that is typical for scanning mirrors, such as Pyrex®, fused silica or sapphire. These are very good materials in terms of their stiffness to mass ratio, and they can be easily coated with standard reflective coatings. However, these materials are not very good conductors of heat, and so that other materials may be used to provide this property.

The reflective body, or mirror 3 may also be fabricated from a solid metal such as berillium, aluminum, brass or iron, and then coated with an appropriate reflective coating material. Metals are very good conductors of heat and may be easily machined, but they also conduct electricity as well, which may tend to create eddy currents within the mirror while it is scanning. These eddy currents will tend to oppose the direction of the scanning in a way that will become a source of dynamic damping in the system. This is a generally undesirable property, but may possibly be also of advantage.

The mirror 3 may also be made from ceramic such as aluminum oxide or beryllium oxide, or from ferrite or powdered metal materials. If the ceramic, ferrite or powdered metal material has a high permeability, flux density can also be increased across the coil 10, and torque can be increased. An additional benefit of fabricating the mirror from ceramic, ferrite or powdered metal material is that these materials are not electrically conductive, thus reducing the chance of formation of eddy currents within the mirror. Moreover, mirror 3 may be constructed from a combination of ceramic and metal, ferrite or powdered metal materials, in order to obtain the best properties of all of these materials.

In another preferred embodiment, mirror 3 may be made from a semiconductor material, such as silicon. Semiconductor materials are readily available and are relatively inexpensive due to their widespread use in integrated circuits. In addition, there are many companies that provide cutting, machining, lapping and polishing services for semiconductor materials. Semiconductors are also generally very good conductors of heat, so any heat generated by the coil 10 would be drawn inwardly in the mirror, away from the coil 10, and then dissipated by the larger surface area of the mirror 3. A drawback to using a semiconductor material might be that these materials have some degree of electrical conductivity, and so as the mirror 3 rotates, eddy currents could be generated. However, electrical conductivity is not very high in these materials, typically on the order of 300 ohm-centimeters, so that any damping effect caused by the eddy currents should be negligible.

The width of the mirror 3 is best determined by the diameter of the beam that the scanner will be moving, and by the angle about which the scanner intends to move the mirror. Preferably, mirror 3 is made approximately 1.5 times as wide as the beam diameter. The length of the mirror 3 is determined by whether or not scanner 21 is to be used in an X-Y configuration. If the scanner 21 is not to be used in an X-Y configuration, then the mirror 3 length and width may be the same. If the scanner 21 is to be used in an X-Y configuration, then the mirror 3 length is determined by the scan angle of the preceding scanner, and in this case, is generally nearly twice as long as it is wide. The thickness of the mirror 3 may typically be approximately from ¹⁄₁₀th to ¹⁄₁₅th of the longest dimension. For example, a system designed to scan a 3 mm beam in an X-Y configuration beam would have a mirror 3 that is about 5 mm wide by about 8 mm long, and around 1 mm thick. A system designed to scan a 10 mm beam in an X-Y configuration would have a mirror 3 that is about 18 mm wide by about 30 mm long, and about 2 mm thick. A typical mirror for use in a preferred embodiment of the invention is shown in FIG. 5.

The coil 10 for the present invention may be made from windings, or turns, of any appropriate conductive material with insulation between the windings. Preferably, however, the coil would be made from what is known in the art as "magnet wire." Magnet wire is known to the skilled as that wire which generally has a round cross section, a relatively small diameter, and which is insulated by varnish, polyester, polymide or other suitable insulative coating. In a preferred embodiment, this insulative coating is of the type that is only partially cured when purchased, and then once it is wound, it is fully cured by using alcohol, acetone or by heating to approximately 150 degrees Celsius. The conductive material of the coil is best selected from aluminum, since aluminum has very good electrical and thermal conductivity, and yet has nearly ¼th the mass of copper. However, the coil 10 may also be made of copper, silver or any other conductive material, and may have a rectangular cross section, or any other suitable cross section. Coil 10 is best positioned at an outer periphery of the mirror 3 and, although the coil can be wound separately and then placed onto the mirror 3, it is preferable that the coil 10 be wound directly onto the perimeter of the mirror 3. In this manner, mirror 3 forms what is known in the art as the "bobbin" for winding.

Figure 7:
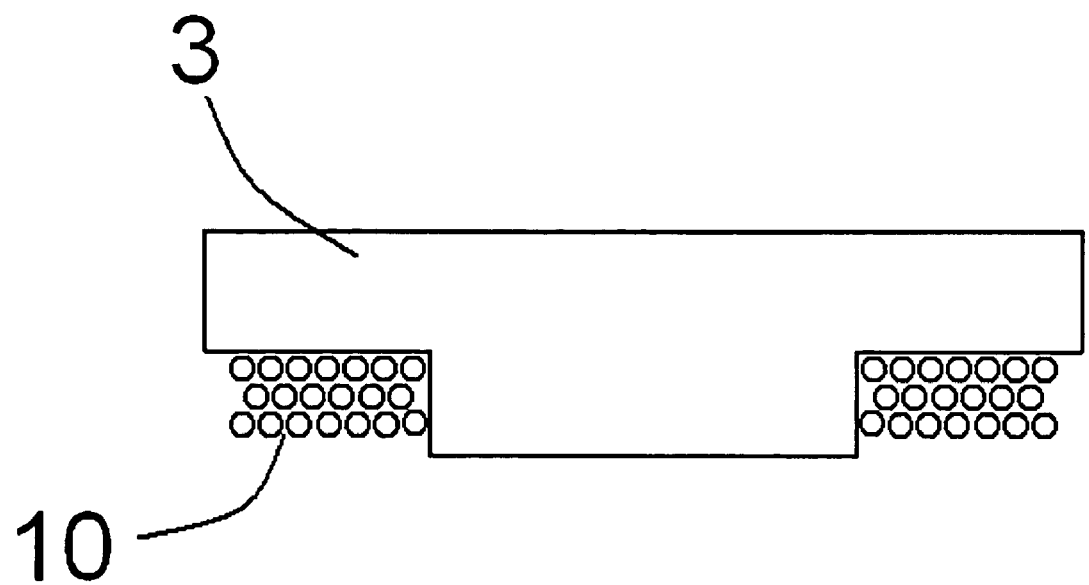
FIG. 7 shows a cross sectional view of a mirror having a coil wound around its periphery with the coil wires positioned in a geometric feature of the mirror, in this example the feature being a notch cut into an underside edge of the mirror.

The mirror 3 may preferably include a geometric feature, shown in FIG. 7, such as a concave, convex, grooved or notched outer periphery or surface to assist in fixing and maintaining the placement of the coil 10 on the outer periphery of the mirror. There may also be a thin layer of a high permeability material between the mirror and the coil 10 which will also assist in fixing and maintaining the placement of the coil 10 and may also slightly increase flux density in the coil 10. The skilled will recognize that the geometric feature described may be differently shaped, for example, the feature could include short projections or posts around which to guide and hold the coil wires. Accordingly, the geometric feature is not to be limited to a cut or hollowed out feature, but may also include protrusions extending outwardly from the mirror. Likewise, positioning of the coil on the mirror would be most advantageous along a periphery of the mirror but may also be alternatively positioned on the mirror, for example, along an undersurface of the mirror.

The reflective body or mirror 3 is supported in such a way that it can not move in a radial direction, but can rotate on one axis, this axis preferably being along a center line of the mirror 3 and in the center of the magnetic circuit 12. In a preferred embodiment, as seen in FIGS. 5–6, this support is accomplished by placing bearings 15 on each side of the mirror 3, and with relatively short shafts 16 connecting mirror 3 to bearings 15. Shafts 16 may be attached to the mirror 3 before or after coil 10 is wound as "mirror end caps", or the short shafts 16 may be an integral part of the mirror 3, machined into the mirror surface during manufacturing.

Instead of bearings 15, the mirror 3 may also be supported by one or more flexural pivots, including cross-flexures. A cross-flexure is a type of flexural pivot that includes two pieces of spring steel that are arranged in a crossing or X shape. A cross-flexure provides strong radial support, but allows rotation to occur. Cross-flexures would be used on this scanning system 21 if it is intended to be used in an application where very high velocity accuracy is needed, or applications that would cause premature bearing failure. Examples of typical flexural pivots and cross-flexures useful in the invention are described in U.S. Pat. Nos. 4,802,720 and 5,097,356, both by Dean Paulsen.

Since the arrangement of magnetic circuit 12 and coil 10 provides for an even amount of force along peripheral edges of the mirror 3, it is not strictly necessary to support the mirror 3 on both sides. For this reason, it is possible to construct this invention in such a way that only one side of the mirror 3 is supported. This type of arrangement has the added advantage of providing yet a smaller package, and could allow better access to the mirror 3 in some applications where space is limited.

As depicted in FIG. 4, the magnetic circuit 12 imparts flux 11 across the coil 10. The magnetic circuit 12 may consist of nothing more than a single magnet 6 oriented in such a way that the north-to-south flux crosses the coil 10. The magnet 6 is preferably made from a magnetic material that his a high energy product, such as neodymium-iron-boron (NdFeB) or samarium-Cobalt (SmCo), but it may also be made from any other suitable magnetic material.

Flux 11 density may be increased by using pole pieces 7 and 17 made from high permeability materials such as iron or steel, to conduct and focus the flux 11 directly across the coil 10. In addition, multiple magnets 6 may be employed to boost the amount of available flux 11.

Figure 1:
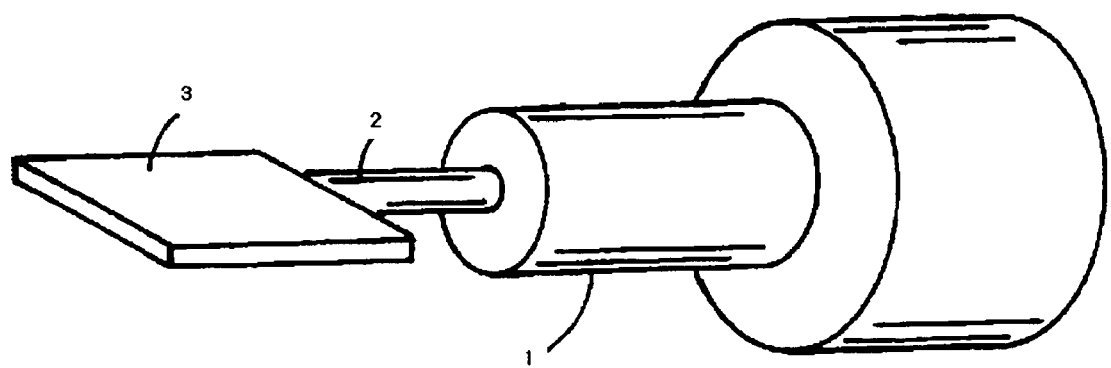
FIG. 1 shows a typical prior art galvanometer-based optical scanner with mirror, the mirror 3 being attached to output shaft 2 of galvanometer 1.
Figure 2:
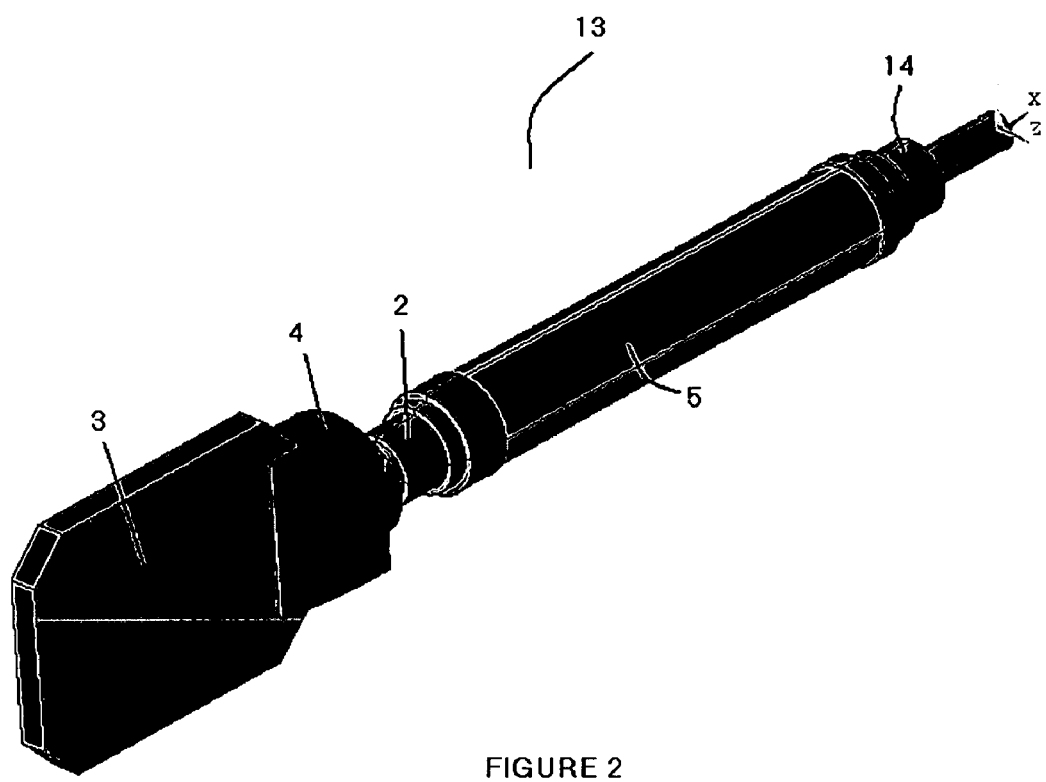
FIG. 2 shows a rotor and mirror of a typical prior art moving magnet galvanometer-based optical scanner, wherein mirror 3 is attached to output shaft 2 by mirror mount 4, and output shaft 2 is attached to cylindrical rotor magnet 5.
Figure 3:
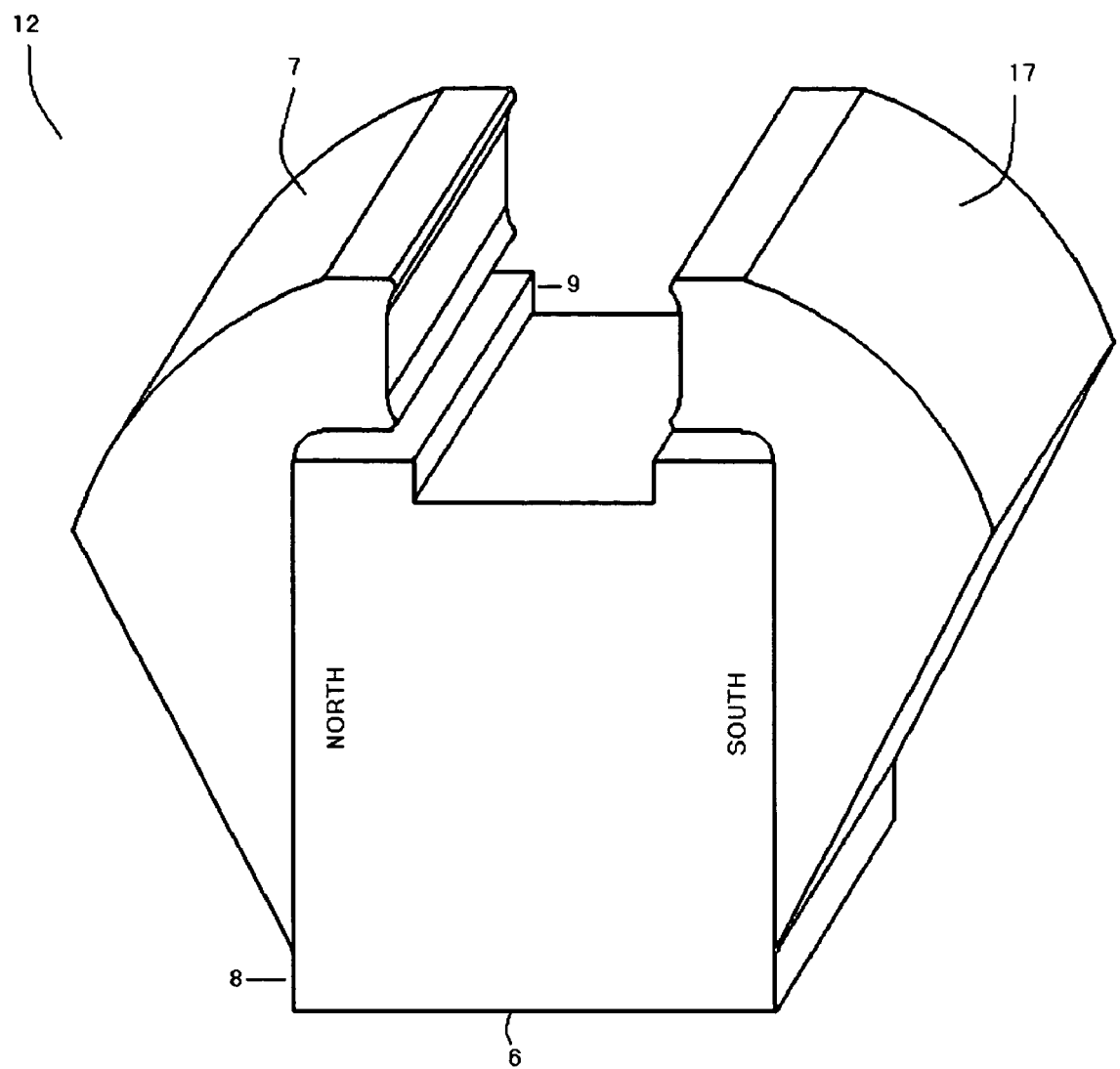
FIG. 3 shows an isometric view of the present invention, including magnetic circuit 12, magnet 6 attached to left pole piece 7 and to right pole piece 17, magnet 6 being preferably extended beyond the edges of the pole pieces, as indicated by reference numeral 8, and having a notched feature 9 close to the coil to allow a balanced flow of flux above and below the coil.

It can be shown that a substantial portion of flux 11 produced by the magnet 6 does not interact with the coil 10 but, instead, merely circulates in air in the form of fringe fields 20. These fringe fields 20 are generally undesirable, and may be decreased by employing multiple magnets and a shielding piece of back iron. Fringe fields 20 may also be decreased by extending magnet 6 beyond the pole pieces in all directions as shown in FIG. 3 as magnet extension 8. This approach is employed in a preferred embodiment of the invention because it is less expensive than a multi-magnet approach and because multi-magnet approaches require tighter manufacturing tolerances.

The magnetic circuit 12 may include a concave, stepped or notched feature 9 located near the coil 10 in order to balance the flux path around coil 10 and to aid in avoiding radial forces acting on the coil 10. The magnetic circuit 12 may also include triangular features for two purposes. Triangular features located near the coil 10 will help make a more compact design, and will aid in placing multiple scanners close together for the purpose of X-Y scanning. In addition, triangular features can also be shown to help decrease unwanted fringe fields 20.

The coil 10 may be connected to a servo driver via thin, electrically-conductive torsion rods, or by "litz wire", or by any other means for making electrical connections to rotating and moving devices, as known in the art.

The invention may be used in what are known as "closed loop applications", where a position sensor is used to determine the position of the mirror. In this case, any suitable position sensor may be used with this invention, including the type that reflects a beam of light off the back side or front side of the mirror 3 to monitor position, or those that attach to a support whereby the mirror 3 is rotationally supported. Accordingly, a position sensor may be part of this invention, but its inclusion or lack thereof should not be construed as a limiting factor in the invention.

Accordingly, in the drawings and specification there have been disclosed typical preferred embodiments of the invention, and although specific terms may have been employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. An optical scanner comprising:
   a reflective body having a generally planar reflective surface;
   a coil of electrically conductive material on said reflective body, said coil including a plurality of windings around a periphery of said reflective body, said coil being connectable to a power source;
   a magnetic circuit having at least one magnet and a pair of magnetically permeable pole pieces, each pole piece of the pair abutting a pole of said at least one magnet, the pair being spaced apart generally opposite each other so as to generate a magnetic flux therebetween; and
   one or more supports whereby said reflective body is rotatably supported relative to said pair of pole pieces having the magnetic flux intersecting said coil.

2. The optical scanner of claim 1, wherein said reflective body comprises a mirror.

3. The optical scanner of claim 1, wherein said reflective body comprises a material selected from glass, metal, ceramic, and semiconductor.

4. The optical scanner of claim 1, wherein said reflective body comprises a ferrite material.

5. The optical scanner of claim 1, wherein said reflective body is formed at least partially from powdered metal.

6. The optical scanner of claim 1, wherein said reflective body comprises silicon.

7. The optical scanner of claim 1, wherein said reflective body comprises at least one non-metallic material.

8. The optical scanner of claim 1, wherein said reflective body comprises at least one metallic material.

9. The optical scanner of claim 1, further comprising a magnetically permeable material between said reflective body and said coil.

10. The optical scanner of claim 1, wherein said reflective body comprises a geometric feature effective for retaining said plurality of windings in position.

11. The optical scanner of claim 10, wherein said geometric feature is selected from a convexity, a groove, and a notch.

12. The optical scanner of claim 1, wherein said coil comprises wire selected from copper, silver, and aluminum.

13. The optical scanner of claim 1, wherein said one or more supports comprises a bearing.

14. The optical scanner of claim 1, wherein said one or more supports are selected from a flexural pivot and a cross-flexure.

15. An optical scanner comprising:
a mirror having a reflective surface and a periphery;
a coil of electrically conductive material, said coil comprising a plurality of windings on a periphery of said mirror;
a magnetic circuit comprising a magnet having opposite poles generating a magnetic flux therebetween; and
a support connected to said mirror, said support rotatably supporting said mirror in the magnetic flux with the magnetic flux intersecting said coil.

16. The optical scanner of claim 15, wherein said mirror comprises a material selected from glass, metal, ceramic, and semiconductor.

17. The optical scanner of claim 15, wherein said mirror comprises a ferrite material.

18. The optical scanner of claim 15, wherein said mirror is formed at least partially from powdered metal.

19. The optical scanner of claim 15, wherein said mirror comprises silicon.

20. The optical scanner of claim 15, wherein said mirror comprises at least one non-metallic material.

21. The optical scanner of claim 15, wherein said mirror comprises at least one metallic material.

22. The optical scanner of claim 15, further comprising a magnetically permeable material between said mirror and said coil.

23. The optical scanner of claim 15, wherein said mirror comprises a geometric feature effective for retaining said plurality of windings in position.

24. The optical scanner of claim 23, wherein said geometric feature is selected from a convexity, a groove, and a notch.

25. The optical scanner of claim 15, wherein said coil comprises wire selected from copper, silver, and aluminum.

26. The optical scanner of claim 15, wherein said one or more supports comprises a bearing.

27. The optical scanner of claim 15, wherein said one or more supports are selected from a flexural pivot and a cross-flexure.

28. A method of scanning a light beam, the method comprising;
providing the optical scanner of claim 15;
applying an alternating electrical current to the coil so as to cause the mirror to rotate responsive to interaction between the alternating current and the magnetic flux; and
reflecting the beam from the reflective surface of the rotating mirror.

29. A method of scanning a light beam, the method comprising:
providing a mirror having a reflective surface and a periphery;
winding a coil of electrically conductive material on the periphery of said mirror;
generating a magnetic flux between opposite poles of a magnet;
rotatably supporting the mirror in the flux on one or more supports so that the flux intersects the coil;
rotating the mirror by applying an alternating electrical current to the coil so as to cause the mirror to rotate on said one or more supports responsive to electrical interaction with the magnetic flux; and
reflecting the beam from the reflective surface of the rotating mirror.

30. The method of claim 29, wherein said mirror comprises a material selected from glass, metal, ceramic, and semiconductor.

31. The method of claim 29, wherein said mirror comprises a ferrite material.

32. The method of claim 29, wherein said mirror is formed at least partially from powdered metal.

33. The method of claim 29, wherein said mirror comprises silicon.

34. The method of claim 29, wherein said mirror comprises at least one non-metallic material.

35. The method of claim 29, wherein said mirror comprises at least one metallic material.

36. The method of claim 29, further comprising positioning a magnetically permeable material between said mirror and said winding.

37. The method of claim 29, further comprising positioning on said mirror a geometric feature effective for retaining said plurality of windings in position.

38. The optical scanner of claim 37, wherein said geometric feature is selected from a convexity, a groove, and a notch.

39. The method of claim 29, wherein said coil comprises wire selected from copper, silver, and aluminum.

40. The method of claim 29, wherein said one or more supports comprises a bearing.

41. The method of claim 29, wherein said one or more supports are selected from a flexural pivot and a cross-flexure.

* * * * *